Feb. 28, 1961 E. A. VOLK, JR., ET AL 2,972,911
STARTER AND ACCESSORY DRIVE
Filed July 27, 1959
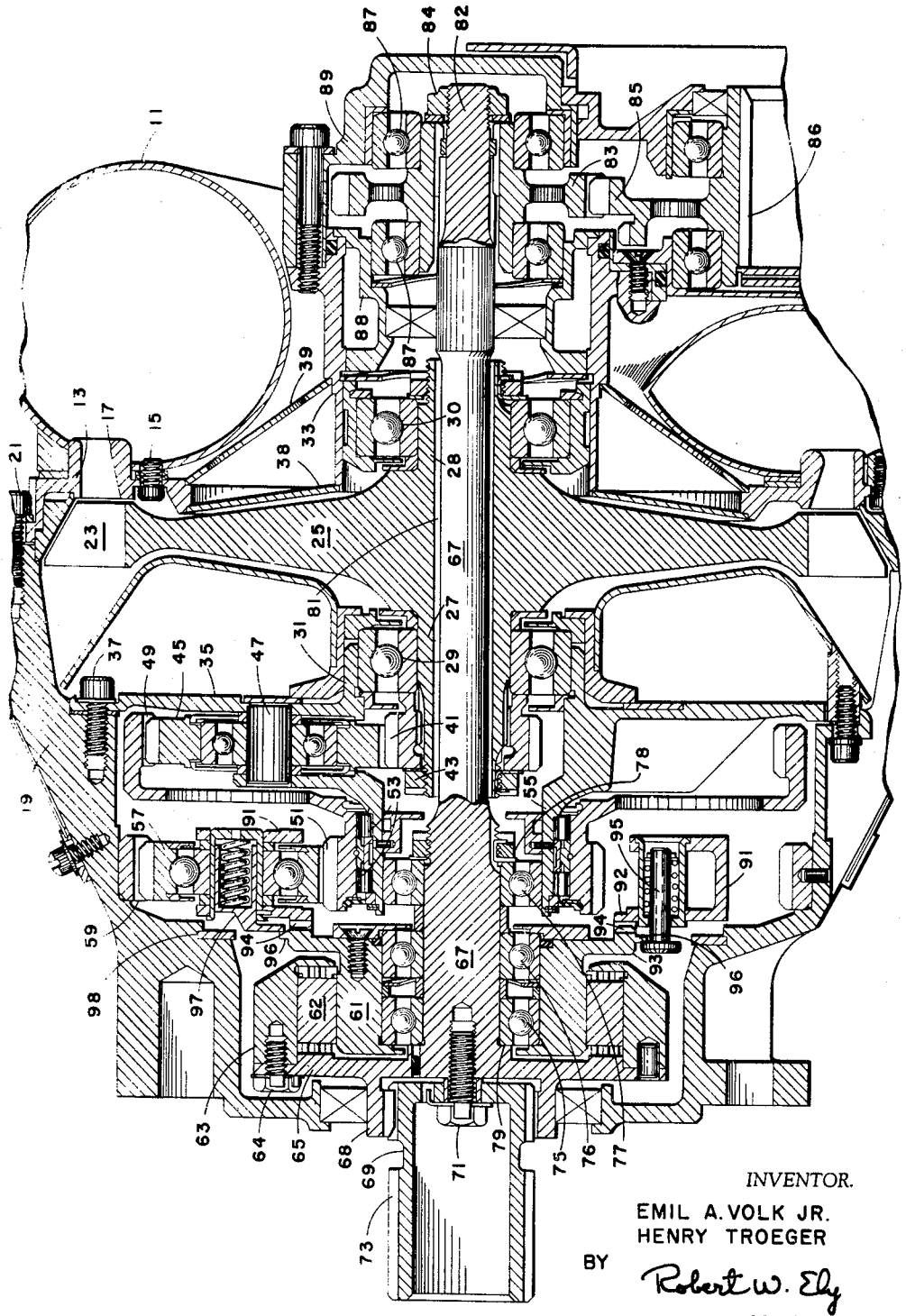
INVENTOR.
EMIL A. VOLK JR.
HENRY TROEGER
BY Robert W. Ely
ATTORNEY United States Patent Office 2,972,911
Patented Feb. 28, 1961

2,972,911

STARTER AND ACCESSORY DRIVE

Emil A. Volk, Jr., Hasbrouck Heights, N.J., and Henry Troeger, Cooperstown, N.Y., assignors to The Bendix Corporation, a corporation of Delaware Filed July 27, 1959, Ser. No. 829,634

9 Claims. (Cl. 74—810)

This invention relates to turbine starters for aircraft engines and more particularly concerns a turbine starter having planetary gearing connected through an overrunning clutch to an engine-connecting member which is rotated by the engine after the starter is no longer energized.

An object of the present invention is to provide an improved turbine starter arrangement whereby the engine after being started can provide power through the engine-connecting member of the starter for driving an accessory such as a pump.

A further object is to provide such a combined starter and accessory drive which is compact and which can transmit torque from a started engine axially through the starter.

Another object is the provision of such a combined starter and axial accessory drive in which the starter means will be protected in the event there is failure of the means which normally permit the engine to overrun the starter.

The realization of the above objects along with the features and advantages of the present invention will be apparent from the following description and the accompanying drawing of an embodiment of the invention.

The accompanying drawing is a longitudinal cross-section view of a turbine starter having an engine-powered accessory drive and shows a turbine wheel, planetary gearing and a sprag clutch arranged to power an engine-connecting member and an axial shaft connected to the engine-connecting member and extending axially through the starter for providing power from an engine to an accessory after the engine is started.

Referring to the drawing, the annular air supply scroll 11 is connected to the annular nozzle ring 13 by fasteners 15 which are radially-inward of scroll-connected nozzles 17 in ring 13. Ring 13 is connected to starter housing 19 by fasteners 21 which are radially outward of the peripheral blades 23 of the turbine wheel 25.

The turbine wheel 25 has a drive hub 27 at the left or drive-side and a support hub 28 at the right or accessory-side. Each hub is rotatably supported by turbine bearings 29, 30 which in turn are respectively carried by axially-extending annular support members 31 and 33. Member 31 at the left of the turbine is part of planetary support structure 35 which extends radially and is connected to housing 19 by fasteners 37. Member 33 at the right of the turbine wheel 25 is supported by housing 19 by conical plates 38 and 39 which extend radially-outward and are attached to the nozzle ring 13. Plate 38 is adjacent the turbine and the more-inclined plate 39 is axially-spaced therefrom and connects to member 33 at its midpoint for support thereof.

The drive hub 27 has a drive pinion 41 splined thereon and urged against the turbine bearing 29 by nut 43. Pinion 41 meshes with first stage planet gears 45 (one appearing) which are carried by support structure 35. The planet gears 45 which rotate on axles 47 mounted in support structure 35 mesh with and drive the ring-gear 49 which extends radially and axially to form second stage pinion 51. Roller bearings 53 and an annular axially-extending part or extension 55 of support structure 35 provide support at pinion 51. Second stage planet gears 57 are driven by pinion 51 and circumferentially mesh in fixed ring gear 59. The planet gears 57 are connected by a reverse torque release arrangement (to be described) to an annular output member 61 which is connected to an annular overhanging flange 63 by a sprag-type overrunning clutch 62. It is to be noted that tubular extension 55 at its engine end is adjacent the turbine side of annular output member 61. Flange 63 is connected by fasteners 64 to a radially-extending flange 65 which is part of the axial accessory drive shaft 67. Shaft 67 has an internally-splined annular extension 68 mated to an externally-splined, cup-like stub shaft 69 which is connected to the end of shaft 67 by fastener 71. The axially-outer splines 73 of stub shaft 69 provide for connecting the starter to a turbine engine.

At the engine end of the accessory drive shaft 67, two ball bearings 75 and 76 extend between the annular output member 61 and shaft 67 and inwardly another ball bearing 77 extends between shaft 67 and the tubular extension 55 of support member 35. A nut 78 threaded on shaft 67 positions bearings 77, 75 and 76 against a shoulder 79 of shaft 67. The accessory drive shaft 67 extends axially through an axial bore 81 in the turbine wheel to form an accessory drive end 82. This shaft end 82 has splined thereto an accessory drive gear 83 which is held by nut 84 threaded on end 82 and meshes with another gear 85 having a splined interior 86 for receiving a connection of an accessory, such as a pump. Ball bearings 87 at each side of gear 83 rotatably support gear 83 and hence shaft 67. Bearings 87 are supported by gear housing members 88 and 89 which are connected to annular support member 33 which in turn is supported by the starter housing 19. It is to be noted that members 33, 88 and 89 form tubular support means encasing the accessory-side hub 28 and the accessory drive end 82 of shaft 67 and that air scroll 11 surrounds this support means and plates 38 and 39 in a compact manner.

From the foregoing, it is apparent that the starter can drive a connected engine to start-up speed and then the engine can overrun (via sprag clutch 65) the starter and drive (by shaft 67) an accessory connected at splines 86.

Referring to the arrangement between the annular output member 61 and the second stage planet gears 57, a planet carrier ring 91 has a radially-inwardly-extending wall 92 which connects with a facing annular flange 93 of member 61 by means of mating jaw teeth 94 which have axially-extending faces and axially-inclined faces. The rings of jaw-teeth 94 are arranged to separate when an associated engine attempts to drive the starter if the overrunning clutch 65 fails or if bearings 75 or 76 fail so that member 61 is driven by shaft 67 which runs after the starter stops. The teeth 94 are urged together by spring-biased plungers 95 (one appearing) carried by planet gear ring 91. Plungers 95 are unlatched from the circumferentially-spaced projecting tabs 96 upon relative rotation of ring 91 due to teeth separation and move axially inwardly. The teeth 94 are spaced apart to prevent clashing by spring-biased pistons 97 (one appearing) carried by ring 91. Pistons 97 are also unlatched from spaced tabs 96 upon relative rotation of ring 91 and move axially outward to abut annular shoulder 98 of housing 19. This action will move the planet gears 57 and ring 91 further axially-inwardly so that the teeth 94 are spaced out of contact. This reverse torque release arrangement is disclosed and claimed in U.S. patent application Serial Number 823,945 (filed June 30, 1959 by Henry Troeger, entitled Starter Having Reverse Torque Release and assigned to the assignee of this application).

In operation, air from scroll 11 passes through nozzles 17 and impinges on blades of the turbine wheel 25 to provide torque at drive pinion 41. Pinion 41 drives the two-stage speed-reducing planetary gear means including first stage planet gears 45 and ring gear 49 and second-stage planet gears 57 and annular output member 61. Member 61 through one-way sprag clutch 62 drives overhanging flange 63 which results in starting torque being transmitted to stub shaft 69. When a turbine engine is connected to stub shaft 69 by splines 73, the engine is thus brought to starting speed. Then the starter is deenergized by cutting off the air supply to scroll 11. At this point, the started engine and hence flange 63 will rotate faster than output member 61 and sprag clutch 62 operates to prevent the engine from driving the starter. As the starter coasts to rest, relative rotation between output member 61 and the engine-driven accessory drive shaft 67 is handled by bearings 75 and 76. After the engine is started, it is apparent that an accessory such as a pump which is connected to accessory gear 85 via splines 86 will be driven by engine-powered accessory drive shaft 67 which extends axially through the starter including turbine wheel 25. It is to be noted that accessory drive shaft is rotatably supported by bearing 77 which is carried by annular extension 55 of the support member 35 connected to housing 19. It is apparent that a compact arrangement has been provided for starting and then for permitting the engine to drive an accessory. If the sprag clutch 62 fails and hence an associated engine cannot overrun the starter, a predetermined reverse torque will operate to separate and relatively rotate jaw teeth 94 so that plunger 95 is unlatched from tab 96 and spacing piston 97 is cleared of tab 96. With this action, jaw teeth 94 fully separate and are spaced by piston 97 abutting shoulder 98 so that the engine does not drive the starter when the output member 61 is engine-driven. In normal operation for starting, the latched arrangement of teeth 94 serves as a torque-transmitting connection between the planetary gear means and the annular output member. After starting, the engine connecting means including stub shaft 69 serves as the connection to accessory drive shaft 67 which is co-axial with the starter whereby a single engine connection is used for two purposes and an accessory drive within the starter housing is provided.

It is to be understood that persons skilled in the art can make changes in the disclosed embodiment without departing from the invention as set forth in the appended claims.

What is claimed is:

1. A turbine starter having an accessory drive for starting an engine and then providing for the engine to drive an accessory comprised of a turbine wheel having a pinion gear, planetary gear means drivingly connected to said pinion gear and terminating in an annular output member, engine connection means including an overrunning clutch connected to said output member for connection to an engine for the starting thereof whereby, when started, the engine will overrun the starter, said turbine wheel having an axial bore, an axial accessory drive shaft connected to said engine connection means and extending through said axial bore in said turbine wheel, said accessory drive shaft having accessory connection means whereby an engine can be started through said engine connection means and then can overrun the starter and drive an accessory.

2. A turbine starter having an accessory drive for starting an engine and then providing for the engine to drive an accessory comprised of a turbine wheel having a pinion gear, planetary gear means drivingly connected to said pinion gear and terminating in an annular output member, engine connection means including an overruning clutch connected to said output member for connection to an engine for the starting thereof whereby, when started, the engine will overrun the starter, said turbine wheel having an axial bore, an axial accessory drive shaft connected to said engine connection means and extending through said axial bore in said turbine wheel, said accessory drive shaft having accessory connection means whereby an engine can be started through said engine connection means and then can overrun the starter and drive an accessory, said planetary gear means including reverse torque release means connected to said annular output member whereby the planetary gear means is not driven if the output member is driven by a connected engine.

3. A turbine starter having an accessory drive for starting an engine and then providing for the engine to drive an accessory comprised of a peripherally-bladed turbine wheel, planetary gear means drivingly connected to said turbine wheel and terminating in an annular output member, housing means encasing said turbine wheel and said planetary gear means, said housing means including an axially-extending tubular support means at the side of said wheel which is opposite said gear means, an air scroll surrounding said tubular support means, said housing means including a ring of nozzles connected into said air scroll, engine connection means including an overrunning clutch connected to said output member for connection to an engine for the starting thereof whereby, when started, the engine will overrun the starter, said turbine wheel having an axial bore, an axial accessory drive shaft connected to said engine connection means and extending through said axial bore in said turbine wheel into said tubular support means, said accessory drive shaft having accessory drive means rotatably mounted in said tubular support means whereby an engine can be started through said engine connection means and then can overrun the starter and drive an accessory.

4. A combined turbine starter and accessory drive comprised of an air turbine wheel having peripheral blades, a drive-side hub and an accessory-side hub, said drive-side hub having a pinion, two-stage planetary gear means drivingly connected to said pinion and having an annular output member, housing means encasing said turbine wheel and said planetary gear means and rotatably supporting said hubs, said housing means having a planetary support which includes an axially-extending tubular extension, said tubular extension extending axially to adjacent said annular output member, engine connecting means including an overrunning clutch connected to said output member, said turbine wheel having an axial bore, an accessory drive shaft connected to said engine connecting means and extending axially through said output member, said tubular extension and said axial bore to provide an accessory drive end, bearing means between said accessory drive shaft and said output member and said tubular extension, and accessory connection means connected to the accessory drive end of said accessory drive shaft whereby the starter can start an engine which can then overrun the starter and drive an accessory.

5. A turbine starter having an accessory drive comprised of a turbine wheel having a drive hub extending from one side and a support hub extending from the other side, an axial bore through said turbine wheel, bearings adjacent each side of said turbine wheel supporting said drive hub and said support hub, said drive hub having a pinion, planetary gear means connected to said pinion, said planetary gear means having an annular output member, an axial shaft extending through said annular output member and the bore of said turbine wheel, said shaft having an annular flange which overhangs said annular output member, a sprag-type overrunning clutch connecting said shaft flange and said annular output member, said axial shaft having a splined member whereby an engine can be connected and powered by the starter, bearings mounted between said annular output member and said axial shaft, a stationary annular support member extending axially between said annular output member and said pinion, a bearing mounted between said support member and said axial shaft, said axial shaft extending beyond said turbine wheel support hub and having an accessory drive end, fixed support means surrounding and rotatably supporting said accessory drive end of said shaft, and reverse torque release means connected between said annular output member and said planetary gear means.

6. A turbine starter having an accessory drive for starting an engine and then providing for the engine to drive an accessory comprised of a peripherally-bladed turbine wheel having a drive-side hub and an accessory-side hub, said drive-side hub having a pinion gear, planetary gear means drivingly connected to said pinion gear and terminating in an annular output member, housing means encasing said turbine wheel and said planetary gear means, said housing means including an axially-extending tubular support means encasing said accessory-side hub of said turbine wheel, said tubular support means extending beyond the end of said accessory-side hub, an air scroll surrounding said tubular support means, said housing means including a ring of nozzles connected into said air scroll, engine connection means including an overrunning clutch connected to said output member for connection to an engine for the starting thereof whereby, when started, the engine will overrun the starter, said turbine wheel having an axial bore, an axial accessory drive shaft connected to said engine connection means and extending through said axial bore in said turbine wheel into said tubular support means, bearing means between said shaft and said output member, said accessory drive shaft having accessory connection means and being rotatably mounted in said tubular support means whereby an engine can be started through said engine connection means and then can overrun the starter and drive an accessory, said planetary gear means including reverse torque release means connected to said output member.

7. A combined turbine starter and accessory drive comprised of an air turbine wheel having peripheral blades, a drive-side hub and an accessory-side hub, said drive-side hub having a pinion, two-stage planetary gear means drivingly connected to said pinion and having an annular output member, housing means encasing said turbine wheel and said planetary gear means and rotatably supporting said hubs, said housing means having a planetary support which includes an axially-extending tubular extension, said tubular extension extending axially to adjacent said annular output member, engine connecting means including an overrunning clutch connected to said output member, said turbine wheel having an axial bore, an accessory drive shaft connected to said engine connecting means and extending axially through said output member, said tubular extension and said axial bore to provide an accessory drive end, bearing means between said accessory drive shaft and said output member and said tubular extension and accessory connection means connected to the accessory drive end of said accessory drive shaft whereby the starter can start an engine which can then overrun the starter and drive an accessory, said housing means including tubular support means rotatably supporting said accessory connection means, an air scroll surrounding said tubular support means, said housing means having a ring of nozzles connected into said air scroll, and said gear means including reverse torque release means connected to said output member.

8. A turbine starter having an accessory drive for starting an engine and then providing for the engine to drive an accessory comprised of a turbine wheel having a pinion gear continuously connected thereto, planetary gear means drivingly connected to said pinion gear and terminating in an annular output member, engine connection means including an overrunning clutch connected to said output member for connection to an engine for the starting thereof whereby, when started, the engine will overrun the starter, said turbine wheel having an axial bore, an axial accessory drive shaft continuously connected to said engine connection means and extending through said axial bore in said turbine wheel, said accessory drive shaft having accessory connection means at the side of said turbine wheel which is opposite said gear means whereby an engine can be started through said engine connection means and then can overrun the starter and drive an accessory, said annular output member rotatably supporting said accessory drive shaft.

9. A turbine starter having an accessory drive for starting an engine and then providing for the engine to drive an accessory comprised of a turbine wheel having a drive-side hub and an accessory-side hub, said drive-side hub having a pinion gear, planetary gear means drivingly connected to said pinion gear and terminating in an annular output member, housing means encasing said turbine wheel and said planetary gear means and rotatably supporting said wheel at said hubs, said housing means including an axially-extending tubular support means encasing said accessory-side hub of said turbine wheel and extending beyond the end of said accessory-side hub, engine connection means including an overrunning clutch connected to said output member for connection to an engine for the starting thereof whereby, when started, the engine will overrun the starter, said turbine wheel having an axial bore, an axial accessory drive shaft connected to said engine connection means and extending through said axial bore in said turbine wheel into said tubular support means, bearing means between said accessory drive shaft and said output member, said housing means rotatably supporting said accessory drive shaft between said output member and the turbine wheel, said accessory drive shaft having accessory connection means and being rotatably mounted in said tubular support means whereby an engine can be started through said engine connection means and then can overrun the starter and drive an accessory.

References Cited in the file of this patent
UNITED STATES PATENTS

| | | |
|---|---|---|
| 2,553,202 | Metsger | May 15, 1951 |
| 2,600,762 | Hartz | June 17, 1952 |
| 2,651,493 | Volk | Sept. 8, 1953 |
| 2,816,449 | Troeger | Dec. 17, 1957 |
| 2,908,189 | Parker et al. | Oct. 13, 1959 |